RATE OF MOISTURE REGAIN OF AMMONIUM HYDROXIDE TREATED AND UNTREATED SILICA FABRICS

United States Patent Office

3,498,774
Patented Mar. 3, 1970

3,498,774
PROCESS FOR IMPROVED HIGH SILICA FIBERS
Richard R. Saffadi, Ridgefield, N.J., assignor to J. P. Stevens & Co., Inc., New York, N.Y., a corporation of Delaware
Filed July 18, 1966, Ser. No. 566,044
Int. Cl. C03c 25/00
U.S. Cl. 65—31                      6 Claims

ABSTRACT OF THE DISCLOSURE

This invention pertains to a method for the formation of highly siliceous glass fibers whereby glass fibers are first leached to dissolve the acid soluble oxides, then washed, immersed in an ammonium hydroxide bath, and finally dried by heating in a furnace at 1650° F. to 2200° F., wherein the improvement comprises the use of a liquid ammonium.

---

Figure 1:
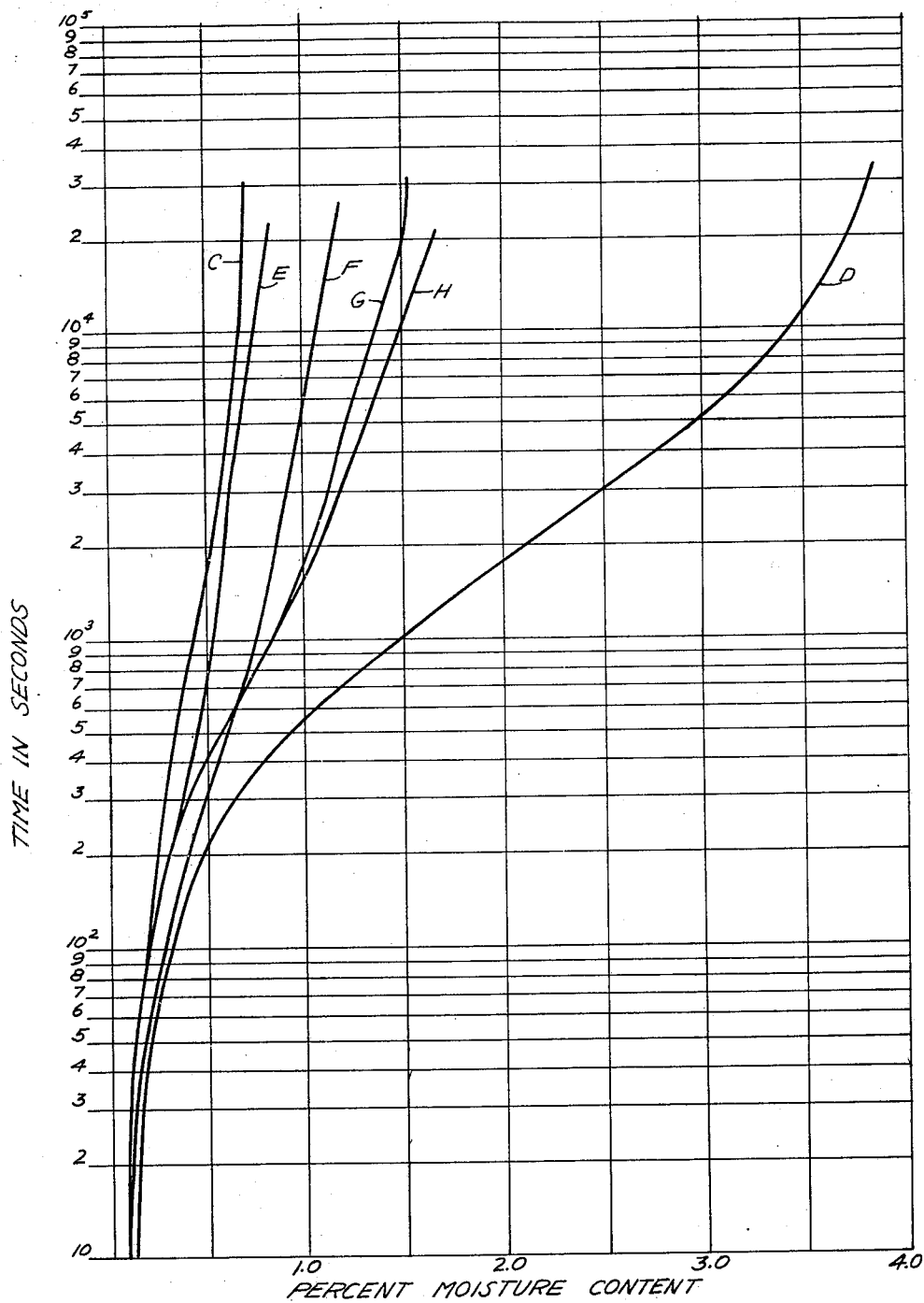

This invention relates to the manufacture of glass fibers of very high silica content, and more particularly to an improved process for preparing highly siliceous fibers which have been subjected to an acid leaching treatment.

The general processes for leaching glass fibers to extract non-siliceous metal oxides is well known and is described, for example, in U.S. Patents Nos. 2,462,841 and 2,491,761. Ordinarily the glass fibers are leached in hot acid, washed, dried, and then heated at high temperatures to shrink and dehydrate them.

As a result of such leaching treatments, glass fibers in the form of yarn, batts, cordage, fabric, etc., can be prepared which have an exceedingly high silica content, i.e., between about 99.0 and 99.9%. Such treated fibers can withstand very high temperatures without degradation and have therefore been found uniquely suited for the manufacture of insulation material.

For example, the leached high silica fibers are frequently utilized to prepare resin-silica laminates which are shaped to form insulating shields around an appropriate body. Thus, high silica fibers in the form of a fabric are often impregnated with a resin, such as a phenolic, polyester, or epoxy, and then built up in layers to form a strong heat-resistance laminate. The exceptional ablation characteristics of such resin-silica laminates make them particularly useful for the protection of the leading surfaces of very high-speed aircraft or missiles where temperatures often exceed 2000° F. and frequently reach 5000° F. or more.

The extreme environmental conditions under which such resin-silica laminates are used require, in the first instance, stringent quality control. The ablative effects of the environment of use tends quickly to exploit any inherent weaknesses in the product. Experience has shown, in this respect, that the water content of the glass fiber, whether unbound or as water of hydration, has an adverse effect on the product. Products prepared from high silica fabric sometimes rupture or blister during use due to the release of water vapor, thereby severely weakening their protective qualities. Moreover, high water content, either free or bound, tends to interfere with the application of resins to the glass, particularly when the high silica fabric has a relatively low pH, i.e., below about 4.0.

Aside from the above drawbacks of conventionally prepared high silica fibers, it is known that the leaching of the glass to remove the non-siliceous constituents tends to weaken the fibers. In order to maximize the physical strength of the leached fibers, it has been found necessary that the step of heating the acid-leached fiber be carefully controlled. During this heating operation, which is commonly done in a furnace at about 1650° F. to 2200° F., the strength of the fiber changes depending upon the time of heating. Ordinarily the strength (measured after firing) of a leached glass fiber increases with firing time until a maximum value is reached, thereafter there occurs a significant decrease in strength, i.e., an inversion. Consequently, the risk of obtaining goods of less than maximum strength is appreciably enhanced unless close control of the heating cycle is maintained, which is not always possible.

It is a primary object of the present invention to overcome the drawbacks associated with the conventional process for acid leaching of silica fibers, and more particularly it is an object of the present invention to provide a method for preparing high silica fibers, whether as a fabric or otherwise, that are compatible with resins and which are suitable for the manufacture of ablation-resistant materials.

It is a further object of the present invention to provide a method for preparing high silica glass fibers of reduced moisture content and reduced water of hydration, and of increased pH.

It is another object of the present invention to provide an improved method for obtaining high silica fibers of consistent high strength.

According to the invention, the high silica fiber is subjected to treatment in an ammonium hydroxide bath after the fiber has been leached but before it has been subjected to heating in the furnace.

The ammonium hydroxide bath has been found to give remarkably improved properties to the high silica fiber. In this respect it has been found that an ammonium hydroxide-treated silica fabric that has also been heat-treated and thoroughly conditioned with respect to relative humidity exhibits a significantly reduced amount of absorbed water and water of hydration as compared to similarly prepared fabrics not treated with ammonium hydroxide. Further, the pH of a treated fabric is increased as compared to a conventional untreated fabric. As a consequence, the fibers of the treated fabric are more compatible with resins, particularly phenolics, and the products formed therefrom are less susceptible to blister and rupture when incorporated in objects subjected to high temperature service.

Equally significant is the finding that the ammonium hydroxide-treated fibers do not risk significant decreasing strength values during the heating cycle. That is to say, the improved effects can be obtained at lower furnace temperatures or shorter residence times than would be required for non-ammonium hydroxide-treated fibers. As a consequence, physical degradation of the silica fiber is impeded and the furnace does not have to work as hard.

The ammonium hydroxide bath treatment of the present invention is a single step in the overall process of high silica fiber manufacture. It is preceded by the acid leaching step and generally a wash-water step that rinses excess acid and contaminants from the fiber. The fiber, usually in the form of a woven fabric, is then immersed in the ammonium hydroxide solution, either with or without a prior drying step.

After removing the fabric from the ammonium hydroxide solution, it is preferably washed with a water spray to remove excess ammonium hydroxide, then dried at moderate temperature and thereafter heat-treated in the furnace to shrink the fabric and drive off as much water as possible.

The ammonium hydroxide bath is effective at room temperature, but slightly improved effects can be obtained at elevated temperatures, e.g. 120–140° F. The concentration of the solution may be maintained in the range of about 2 to 20% by weight of $NH_4OH$, and preferably is maintained between about 5 to 10%.

measurements were after conditioning at 50.5%±2%, R.H. at 74° F. ±2° F. for 16 hours.

TABLE II

| Sample No. | $NH_4OH$ bath | $NH_4OH$ bath conditions | Furnace temp., °F./time, min. | Moisture[1] content, percent | Water of hydration, percent | pH |
|---|---|---|---|---|---|---|
| C | No | | 1,900/3 | 1.09 | 0.41 | 3.65 |
| D | No | | 1,700/3 | 4.86 | 1.27 | 3.60 |
| E | Yes | 140 g./l ($NH_3$) at 120–140° F | 1,700/3 | 1.24 | 0.38 | 5.30 |
| F[2] | Yes | 140 g./l ($NH_3$) at 120–140° F | 1,700/3 | 1.19 | 0.43 | 5.05 |
| G | Yes | 140 g./l ($NH_3$) at room temp | 1,700/3 | 1.76 | 0.68 | 4.00 |
| H[2] | Yes | 140 g./l ($NH_3$) at room temp | 1,700/3 | 1.55 | 0.76 | 4.30 |

[1] Loss of moisture measured after 4 hours at 110° C.±2° C.
[2] Not dried; immersed wet.

The time of immersion of the silica fiber should be sufficient to obtain substantial contact between the surface of the silica fiber and the solution. Complete penetration or impregnation is therefore desired and the time required depends upon the physical nautre of the silica, i.e., whether it is yarn, batt, cordage or fabric, and upon the weight of the fiber. Most yarns can be adequately treated within about 5 to 10 minutes, for the concentrations of ammonium hydroxide referred to above.

EXAMPLE 1

Two samples of 24½ oz./yd. fiberglass fabric having G filament yarn and a thread count of 44 warp and 35 fill were separately treated to form high silica materials. Both samples (identified as "A" and "B") were first leached to dissolve the acid soluble oxides by immersion for 90 minutes in a concentrated bath (160 g./l.) of hydrochloric acid at a temperature of about 190° F. They were then washed with demineralized water to remove residual acid and solid contaminants.

Thereafter, Sample A was dried at 110° C. for 5 minutes, then fired in a furnace at 1700° F. for 3 minutes and finally conditioned at 65% relative humidity (R.H.) at 72° F.

Sample B was treated, i.e., dried, fired and conditioned, in the same manner as Sample A except that, prior to the drying step, the B fabric was immersed for a few minutes in a room temperature ammonium hydroxide bath (70 g./l. of $NH_3$).

Both the ammonium hydroxide treated Sample B and the non-treated Sample A were tested for percent by weight of moisture content (unbound), water of hydration, and pH. The results are given below in Table I.

TABLE I

| | Sample A | Sample B |
|---|---|---|
| Moisture content, percent | 8.19 | 7.08 |
| Water of hydration, percent | 2.18 | 1.05 |
| pH | 3.55 | 4.65 |

These results show that the ammonium hydroxide-treated fabric (Sample B) could take advantage of a lower firing temperature to yield a shrunk product with a lower water of hydration, a lower water content, and a higher pH, than an untreated fabric.

EXAMPLE 2

Several samples of the same G filament fabric of Example 1 were subjected to varying conditions of treatment both with and without the use of an ammonium hydroxide bath. The conditions used and the test results obtained are set forth in Table II below. In each instance, except as noted, the fabric had been hot acid leached for 90 minutes at 190° F. in 160 g./l. of HCl, rinsed with pure water, and dried at 110° C. for 5 minutes. Moisture A comparison of Samples G and H with D shows that the moisture content of the fabric is reduced considerably, as is the water of hydration, when the leached fabric (wet or dry) is treated at room temperature according to the invention.

The effect is even more noticeable when the ammonium hydroxide bath is maintained at between 120 and 140° F. (compare Samples E and F with Sample D).

A comparison of the results of Sample C with those of Samples E and F reveals that a treated fabric fired at 1700° F. for 3 minutes has a moisture regain and a water of hydration similar to an untreated fabric fired at the higher 1900° F. temperature.

In all cases where the ammonium hydroxide treatment was used, the pH showed an appreciable increase as compared to untreated specimens, with the hot ammonium hydroxide bath showing the highest pH.

EXAMPLE 3

Specimens of all of the samples prepared in Example 2 were anayzed for rate of moisture regain.

After each specimen was conditioned as set forth in Example 2, it was heated for 30 minutes ±1 minute at 325° F. ±5° F. and the rate at which the fabric returned to the equilibrium condition of moisture content was carefully measured. The results of these measurements are set forth in FIGURE 1 hereof, which is a semilogarithmic plot of percent moisture content against time.

From FIGURE 1 it is seen that at equilibrium the conditions were as follows:

| Sample No.: | Moisture content, percent |
|---|---|
| C | 0.76 |
| D | 4.07 |
| E | 0.84 |
| F | 1.28 |
| G | 1.56 |
| H | 1.86 |

Although Sample C (non-treated fabric fired at 1900° F.) showed the smallest moisture content and the fastest rate of moisture regain, the treated samples fired at 1700° F. (Nos. E, F, G, H) had far smaller moisture contents than the comparable untreated samples fired at 1700° F. (No. D), and were only slightly higher than Sample C. Again, among the treated samples the ones using the hot ammonium hydroxide (Nos. E and F) showed the lowest values.

The fabrics subjected to higher firing temperatures show appreciably reduced moisture content however, the higher furnace temperatures are also known to degrade the physical strengths of the fibers and thus are considered detrimental to the fiber. On the other hand, the ammonium hydroxide treatment of the invention acts to reduce moisture content and water of hydration without the necessity of going to strength-degrading firing temperatures.

EXAMPLE 4

A G-filament high silica glass fabric or 24½ oz./yd.² and a thread count of 44 warp and 35 fill was prepared by leaching the fabric in 160 g./l. HCl for one hour at 190° F. and thereafter drying at 110° C. for 5 minutes. Samples of this fabric were finished both with and without ammonium hydroxide treatment as set forth below in Table III and then tested for moisture content, water of hydration and pH, after conditioning at 65% R.H. at 72° F. for at least 2 days.

TABLE III

| Sample No. | NH₄OH bath | NH₄OH bath conditions | Furnace temp., °F./time, min. | Moisture content, percent [1] | Water of hydration, percent [1] | pH [1] |
|---|---|---|---|---|---|---|
| I | No | | 1,700/3 | 8.19 | 2.18 | 3.55 |
| J | Yes | 70 g./l. (NH₃) at room temp. | 1,700/3 | 7.08 | 1.05 | 4.65 |
| K | No | | 1,800/3 | 7.11 | 1.86 | 3.50 |
| L | Yes | 70 g./l. (NH₃) at room temp. | 1,800/3 | 5.80 | 1.18 | 4.55 |

[1] Average values.

A comparison of the test results of Samples I and J and of Samples K and L shows that the ammonium hydroxide treatment effectively reduces both the moisture content and water of hydration, with a consequent rise in pH. Consequently, a leached fabric pre-treated with ammonium hydroxide will require a relatively low firing temperature to yield a well shrunk silica fabric with a low water of hydration content and an acceptable pH.

It is noteworthy that the increase in pH is not due to residual $NH_3$ in the silica matrix, for analyses have shown that the nitrogen content of treated and untreated silica fibers after firing are practically the same, ranging from 20 to 70 p.p.m.

The pH can be even further increased by subjecting the silica fabric to an atmosphere of ammonia vapor, as by placing the fabric (after firing) for about one-half minute in the vapor space over a pan containing a concentrated ammonium hydroxide solution.

What I claim is:

1. In the process of preparing a high silica glass fiber product comprising the steps of acid-leaching a fibrous glass and thereafter heat-shrinking and dehydrating said fibrous glass at between about 1650° F. to 2200° F., the improvement comprising contacting the fibrous glass, after the acid-leaching step and before the heat-shrinking and dehydrating step, with a solution of ammonium hydroxide at a temperature ranging between room temperature and 140° F., whereby the amount of absorbed water and water of hydration is significantly reduced as compared to similarly prepared, non-ammonium hydroxide treated fibrous glass.

2. The process according to claim 1 wherein the ammonium hydroxide solution has a concentration of between about 2 and 20% ammonium hydroxide.

3. The process according to claim 2 wherein the concentration of the ammonium hydroxide is between about 5 and 10%.

4. The process according to claim 1 wherein the temperature of the ammonium hydroxide solution is between about 120° F. and 140° F.

5. The process according to claim 1 wherein the ammonium hydroxide solution has a concentration of between about 2% and 20% and a temperature of between about room temperature and 140° F., and the leached glass fiber is immersed in said solution for between about 5 and 10 minutes.

6. The process according to claim 1 wherein the silica glass fiber product is a fabric.

References Cited

UNITED STATES PATENTS

| 3,113,008 | 12/1963 | Elmer | 65—31 |
| 3,149,946 | 9/1964 | Elmer | 65—31 |

S. LEON BASHORE, Primary Examiner

JOHN H. HARMAN, Assistant Examiner

U.S. Cl. X.R.

156—24

UNITED STATES PATENT OFFICE
CERTIFICATE OF CORRECTION

Patent No. 3,498,774      Dated March 3, 1970

Inventor(s) Richard R. Saffadi

It is certified that error appears in the above-identified patent and that said Letters Patent are hereby corrected as shown below:

In the Specification
Column 1, line 28 delete "2,462,841" and insert therefor --2,461,841--; Column 1, line 45 delete "resistance" and insert therefor --resistant--. Column 3, line 23 delete "nautre" and insert therefor --nature--. Column 4, line 39 delete "anayzed" and insert therefor --analyzed--.

SIGNED AND SEALED
AUG 18 1970

(SEAL)
Attest:

Edward M. Fletcher, Jr.
Attesting Officer

WILLIAM E. SCHUYLER, JR.
Commissioner of Patents